Patented Sept. 28, 1937

2,094,000

UNITED STATES PATENT OFFICE 2,094,000

COUMARIN - 3 - CARBOXYLIC ACID SALT OF AN AMINO ALCOHOL AND PROCESS OF PRODUCING THE SAME

Otto Dalmer and Fritz von Werder, Darmstadt, Germany, assignors to Merck & Co., Inc., Rahway, N. J., a corporation of New Jersey No Drawing. Application September 15, 1934, Serial No. 744,168. In Germany September 22, 1933

11 Claims. (Cl. 260—123)

This invention relates to coumarin-carboxylic acid salts of certain aryl-substituted amino alcohols of the type of ephedrine, its homologues and derivatives having the general formula

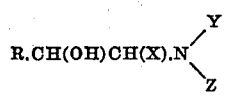

(R=phenyl or substituted phenyl, X, Y, Z=hydrogen or alkyl), as will further appear, and to processes for their production.

Although the well-known sympathomimetically-acting bases of the ephedrine group exhibit properties which are medicinally valuable, such as deepened respiration and increased blood pressure, they also manifest undesirable, irritating by-effects which, in relatively large doses, lead to clonic-tonic spasms.

However, it has been found that such compounds, when combined with coumarin-3-carboxylic acid, will not show unfavorable by-effects to such a pronounced degree. Nothing has hitherto been known as to the physiological action of coumarin-3-carboxylic acid. It was, therefore, not to be anticipated that the new compounds formed by combining this acid with bases of the group mentioned, would manifest, instead of a stimulating effect, a sedative action which is characterized by lethargy and slight narcosis, and which is increased when the compounds are administered in relatively large doses.

Furthermore, it is noteworthy that the combination of racemic trans-ephedrine with coumarin-carboxylic acid is effective in considerably smaller doses than is racemic trans-ephedrine alone. The "therapeutic latitude", that is, the relationship of fatal dose to effective limit, which in racemic trans-ephedrine combined with coumarin-carboxylic acid brings about deepened respiration and slight narcosis, and in transephedrine alone brings about slight irritative spasms, is much greater with the former and, therefore, more favorable with it than with the known racemic trans-ephedrine.

The following table shows the values which resulted from pharmacological experiments on mice:

| Method of application | Effective dose | Fatal dose |
|---|---|---|
| *Racemic trans-ephedrine salt of coumarin-carboxylic acid* | *Mg/g.* | *Mg/g.* |
| Intravenous | 0.01 | 0.05 |
| Subcutaneous | 0.025 | 0.1 |
| Per os | 0.025 | 0.25 |
| *Racemic trans-ephedrine* | | |
| Intravenous | 0.1 | 0.175 |
| Subcutaneous | 0.5 | 1.0 |
| Per os | 1.0 | 1.5 |

The new compounds are prepared by reacting with coumarin-3-carboxylic acid upon sympathomimetically-acting bases. For example, they may be prepared by mixing the components in solution in appropriate solvents and permitting crystallization, or by melting the components together, or they may be prepared by cross-reaction in solution between salts of coumarin-3-carboxylic acid and salts of ephedrine-like bases. In the sense of our invention, bases of the ephedrine type are understood to be sympathomimetically effective compounds of its homologues and derivatives of the general formula:

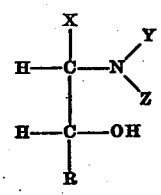

wherein R is a phenyl or substituted phenyl group, and X, Y, and Z are hydrogen or alkyl groups.

The various steps of the process are set forth in the accompanying examples. Obviously, these steps may be modified considerably with respect to their order and number and the specific materials used, without departing from the spirit of the invention substantially as described and claimed, and it is understood that we do not desire to limit ourselves to the specific embodiments shown.

Example I 190 parts by weight of coumarin-3-carboxylic acid are dissolved in 3600 parts by volume of acetone, and 165 parts by weight of racemic trans-ephedrine are dissolved in 1650 parts by volume of acetone. Both solutions are combined while hot and kept boiling on the reflux for half an hour. While boiling, the salt begins to separate and after cooling is filtered off by suction and washed out with cooled acetone. By recrystallization from water, 297 parts by weight of pure salt are obtained in the form of finely formed large crystals, having a melting point of 196°.

Example II 825 parts of l-ephedrine and 950 parts of coumarin-3-carboxylic acid are finely pulverized and thoroughly mixed. The mixture is carefully melted in an oil bath at 140°. The molten mass after cooling is dissolved in a small amount of alcohol; from this solution the salt is precipitated by adding a three-fold volume of ether, and is finally recrystallized from acetone. The product is obtained in the form of colorless needles, which after drying melt at 136–137°. 100 parts of water at 20° dissolve 8.29 parts of the salt.

Example III

Warm solutions of 21 parts by weight of 1-1-phenyl-2-methylamino-ethan-1-ol in 250 parts by volume of acetone are combined with 26.4 parts by weight of coumarin-3-carboxylic acid in 560 parts by volume of acetone. During mixing, a crystalline pulp is precipitated. The whole is boiled for a short time under refluxing. The crystallization product, isolated after cooling, is recrystallized from alcohol and is obtained in the form of fine colorless needles having a melting point of 184°.

Example IV

By mixing a solution of 11 parts by weight of 1 p-aminophenyl-2-methylamino-propanol in 100 parts by volume of acetone with a solution of 11.6 parts by weight of coumarin-3-carboxylic acid in 270 parts by volume of acetone, heat is liberated. Immediately following, crystallization of the formed salt sets in, and the salt is separated after cooling and recrystallized from methanol. 16 parts by weight of salt are obtained in the form of leaves, having a melting point of 182°.

Example V 380 parts of coumarin-3-carboxylic acid are dissolved in a large excess of acetone. To the solution, heated to 40°, 366 parts of l-adrenaline base are added in small amounts under constant stirring. After all has been added, the stirring is continued for another hour and the temperature slowly increased to 50°. Finally the reaction container is closed tightly and left standing for 24 hours at room temperature. Thereafter, the unchanged l-adrenaline base is filtered off by suction and washed out with acetone. From the concentrated filtrate the desired salt is obtained, having a melting point of 162–163°.

Example VI 40,000 parts by volume of hot chloroform are poured over 34 parts by weight of 1-p-hydroxyphenyl-2-methylamino-ethan-1-ol. After adding a solution of 38.8 parts by weight of coumarin-3-carboxylic acid in 10,000 parts by volume of chloroform, the whole mixture is heated to boiling for half an hour during refluxing. The diluent is distilled off as far as possible, the rest is removed in vacuo. The residue is recrystallized from a little alcohol. Approximately 60 parts by weight of salt are obtained in the form of solid prisms, having a melting point of 192°.

Example VII 1.5 parts by weight of freshly precipitated barium salt of coumarin-3-carboxylic acid are suspended in 70 parts of water without previous drying and shaken with a solution of 2 parts by weight l-ephedrinesulphate for some time, heating the mixture slightly. The change in the outer appearance of the precipitate indicates the end of the cross-reaction: the copious barium salt of coumarin-3-carboxylic acid changes into the finely powdered, rapidly sedimenting barium-sulphate. The precipitate is then filtered off and the solution evaporated to dryness. By recrystallizing the residue from acetone the pure l-ephedrine salt of coumarin-3-carboxylic acid is obtained, having a melting point of 137°.

We claim as our invention:

1. A coumarin-3-carboxylic acid salt of a substituted amino alcohol having the general formula R—CHOH—CH$_2$—NHCH$_3$, wherein R is selected from the group consisting of phenyl, aminophenyl, and hydroxyphenyl.

2. The coumarin-3-carboxylic acid salt of 1-p-hydroxyphenyl-2-methylamino-ethan-1-ol.

3. The coumarin-3-carboxylic acid salt of racemic trans-ephedrine.

4. The coumarin-3-carboxylic acid salt of l-ephedrine.

5. A process for the production of a coumarin-3-carboxylic acid salt of a substituted amino alcohol having the general formula R—CHOH—CH$_2$—NHCH$_3$, wherein R is selected from the group consisting of phenyl, amino-phenyl, and hydroxyphenyl, which comprises reacting upon said alcohol with coumarin-3-carboxylic acid.

6. A process for the production of the coumarin-3-carboxylic acid salt of 1-p-hydroxyphenyl-2-methylamino-ethan-1-ol which comprises reacting upon said 1-p-hydroxyphenyl-2-methylamino-ethan-1-ol with coumarin-3-carboxylic acid.

7. A process for the production of the coumarin-3-carboxylic acid salt of racemic trans-ephedrine which comprises reacting upon racemic trans-ephedrine with coumarin-3-carboxylic acid.

8. A process for the production of the coumarin-3-carboxylic acid salt of l-ephedrine which comprises reacting upon l-ephedrine with coumarin-3-carboxylic acid.

9. A process for the production of a coumarin-3-carboxylic acid salt of a substituted amino alcohol having the general formula R—CHOH—CH$_2$—NHCH$_3$, wherein the radical R is selected from the group consisting of phenyl, aminophenyl, and hydroxyphenyl, which comprises mixing said acid and said alcohol in solution in an inert aliphatic solvent, and thereafter crystallizing out said salt.

10. A process for the production of a coumarin-3-carboxylic acid salt of a substituted amino alcohol having the general formula R—CHOH—CH$_2$—NHCH$_3$, wherein R is selected from the group consisting of phenyl, amino-phenyl, and hydroxyphenyl, which comprises melting said acid and said alcohol together, cooling the resultant molten mass and dissolving in alcohol, precipitating the salt by the addition of ether, and thereafter crystallizing said salt from acetone.

11. A process for the production of a coumarin-3-carboxylic acid salt of a substituted amino alcohol having the general formula R—CHOH—CH$_2$—NHCH$_3$, wherein R is selected from the group consisting of phenyl, amino-phenyl, and hydroxyphenyl, which comprises cross reaction in solution between a salt of coumarin-3-carboxylic acid a and salt of a substituted amino alcohol.

OTTO DALMER.
FRITZ VON WERDER.